United States Patent
Magarill et al.

(10) Patent No.: US 6,972,810 B2
(45) Date of Patent: Dec. 6, 2005

(54) OPTICAL SYSTEMS FOR REFLECTIVE LCDS

(75) Inventors: Simon Magarill, Cincinnati, OH (US); John D. Rudolph, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 162 days.

(21) Appl. No.: 10/169,282
(22) PCT Filed: Nov. 1, 2001
(86) PCT No.: PCT/US01/50674
§ 371 (c)(1), (2), (4) Date: Jun. 27, 2002
(87) PCT Pub. No.: WO02/37175
PCT Pub. Date: May 10, 2002

(65) Prior Publication Data
US 2003/0007105 A1 Jan. 9, 2003

Related U.S. Application Data
(60) Provisional application No. 60/245,360, filed on Nov. 2, 2000.

(51) Int. Cl.⁷ .................. G02F 1/1335; G03B 21/14
(52) U.S. Cl. .................. 349/8; 349/9; 353/20; 353/33
(58) Field of Search .................. 349/5, 158, 9, 349/8; 353/119, 33, 34, 20, 31; 359/486–489

(56) References Cited

U.S. PATENT DOCUMENTS

| | | | | |
|---|---|---|---|---|
| 5,675,414 A | * | 10/1997 | Rowell et al. | 356/450 |
| 5,751,384 A | | 5/1998 | Sharp | |
| 5,946,054 A | * | 8/1999 | Sannohe et al. | 348/745 |
| 5,988,818 A | * | 11/1999 | Fujimori et al. | 353/119 |
| 6,042,234 A | * | 3/2000 | Itoh | 353/20 |
| 6,132,047 A | | 10/2000 | Itoh | |
| 6,183,091 B1 | | 2/2001 | Johnson | |
| 6,234,634 B1 | * | 5/2001 | Hansen et al. | 353/20 |
| 6,348,997 B1 | | 2/2002 | Itoh | |
| 6,419,362 B1 | * | 7/2002 | Ikeda et al. | 353/20 |
| 6,447,120 B1 | * | 9/2002 | Hansen et al. | 353/20 |
| 6,447,121 B1 | * | 9/2002 | Woo | 353/52 |

OTHER PUBLICATIONS

U.S. Appl. No. 60/292,178, filed May 2001, Magarill et al.
U.S. Appl. No. 10/147,274, filed May 2002, Magarill et al.
Robinson, et al., "High Contrast Color Splitting Architecture Using Color Polarization Filters," *SID 00 Digest*, p. 92–95, 2000.

* cited by examiner

*Primary Examiner*—Toan Ton
(74) *Attorney, Agent, or Firm*—George W. Jonas

(57) ABSTRACT

Optical systems for projection optical devices which employ reflective LcoS panel (9, 14, 15) are provided. The systems provide high contrast, compact size, and high light throughput.

36 Claims, 6 Drawing Sheets

OPTICAL SYSTEMS FOR REFLECTIVE LCDS

CROSS REFERENCE TO RELATED APPLICATIONS

This application is the U.S. national phase under 35 USC §371 of International Application No. PCT/US01/50674, filed Nov. 1, 2001, which was published in English under PCT Article 21(2) on May 10, 2002 as International Publication No. WO 02/37175. This application claims the benefit under 35 USC §119(e) of U.S. Provisional Application No. 60/245,360 filed Nov. 2, 2000.

FIELD OF INVENTION

This invention relates to projection optical devices which employ reflective LCDs and, in particular, reflective Liquid Crystal on Silicon (LCoS) panels.

BACKGROUND OF THE INVENTION

An optical layout for a projection system using reflective LCDs is described in "High Contrast Color Splitting Architecture Using Color Polarization Filters," Michael G. Robinson, et al., SID 00 Digest, p. 92–95. This system uses COLORSELECT™ polarization filter technology and according to these authors provides contrast better than 500:1 and transmission better than 50% for polarized light.

Drawbacks of this system include:

Input light has to be polarized. This means that one needs to use a polarization converter which results in additional cost and low efficiency.

Contrast, color coordinates and throughput of the system are determined by the properties of the COLORSELECT™ polarization filters used in the system, which make it difficult to balance all three parameters at the same time.

A typical application of this system requires a lamp with a long lifetime and an extremely small source of light such as a high-pressure mercury lamp (UHP type). Such a lamp has a limited intensity in the red area of the spectrum. This means that to obtain a desired color temperature for a white screen one has to partially suppress the green and blue light. Such a suppression of green and blue light significantly reduces the throughput of the system.

As discussed below, the present invention overcomes the above drawbacks of current projection systems that employ COLORSELECT™ polarization filters.

SUMMARY OF THE INVENTION

In accordance with a first of its aspects, the invention provides an optical system for use with a projection lens (11) and an illumination system (5) that produces randomly polarized light, said randomly polarized light comprising first (e.g., green), second (e.g., blue), and third (e.g., red) spectral portions, said optical system comprising:

(a) a first polarization separator (1) arranged to receive light from the illumination system (5) and to separate that light into a first polarized component having a first polarization (e.g., P-polarization) and a second polarized component having a second polarization (e.g., S-polarization), said second polarization being orthogonal to said first polarization;

(b) a second polarization separator (2) arranged to receive the first polarized component (e.g., P-polarization) from the first polarization separator (1);

(c) a first filter (6) between the first polarization separator (1) and the second polarization separator (2), said filter transmitting substantially only light of the first spectral portion (e.g., green) to the second polarization separator (2);

(d) a reflective liquid crystal device (9 or 9 and 10) arranged to receive light of the first spectral portion (e.g., green) from the second polarization separator (2), to modulate the polarization of said light on a pixel-by-pixel basis, and to reflect said light back to the second polarization separator (2);

(e) a third polarization separator (3) arranged to receive the second polarized component (e.g., S-polarization) from the first polarization separator (1);

(f) a second filter (12) between the first polarization separator (1) and the third polarization separator (3), said filter transmitting substantially only light of the second (e.g., blue) and third (e.g., red) spectral portions to the third polarization separator (3);

(g) a first polarization converting filter (13) between the first polarization separator (1) and the third polarization separator (3), said first polarization converting filter (13) rotating the polarization (e.g., S-polarization) of the second (e.g., blue) spectral portion by 90 degrees (e.g., to P-polarization);

(h) a reflective liquid crystal device (15 or 15 and 10) arranged to receive light of the second (e.g., blue) spectral portion from the third polarization separator (3), to modulate the polarization of said light on a pixel-by-pixel basis, and to reflect said light back to the third polarization separator (3);

(i) a reflective liquid crystal device (14 or 14 and 10) arranged to receive light of the third (e.g., red) spectral portion from the third polarization separator (3), to modulate the polarization of said light on a pixel-by-pixel basis, and to reflect said light back to the third polarization separator (3);

(j) a fourth polarization separator (4) arranged to:

(A) receive polarization modulated light of the first (e.g., green) spectral portion from the second polarization separator (2) and polarization modulated light of the second (e.g., blue) and third (e.g., red) spectral portions from the third polarization separator (3), and (B) provide said received polarization modulated light of the first (e.g., green), second (e.g., blue), and third (e.g., red) spectral portions to the projection lens (11); and (k) a second polarization converting filter (13) between the third polarization separator (3) and the fourth polarization separator (4), said polarization converting filter rotating the polarization of the second (e.g., blue) spectral portion by 90 degrees.

In certain preferred embodiments of the first aspect of the invention, the optical system further comprises two half-wave plates (8), one between the first polarization separator (1) and the second polarization separator (2) and the other between the second polarization separator (2) and the fourth polarization separator (4).

In accordance with a second of its aspects, the invention provides an optical system for use with a projection lens (11) and an illumination system (5) that produces randomly polarized light (e.g., an illumination system which comprises a high-pressure mercury lamp), said randomly polarized light comprising first (e.g., green), second (e.g., blue), and third (e.g., red) spectral portions, said optical system comprising:

(a) a first polarization separator (1) arranged to receive light from the illumination system (5) and to separate that light into a first polarized component having a first polarization (e.g., P-polarization) and a second polarized component having a second polarization (e.g., S-polarization), said second polarization being orthogonal to said first polarization;

(b) a second polarization separator (2) arranged to receive the first polarized component from the first polarization separator (1);

(c) a first filter (16) between the first polarization separator (1) and the second polarization separator (2), said filter transmitting substantially only light of the first (e.g., green) and third (e.g., red) spectral portions to the second polarization separator (2);

(d) a first polarization converting filter (17) between the first polarization separator (1) and the second polarization separator (2), said first polarization converting filter (17) rotating the polarization (e.g., P-polarization) of one of the first (e.g., green) and third (e.g., red) spectral portions by 90 degrees (e.g., rotating the polarization of the red spectral portion to S-polarization);

(e) a reflective liquid crystal device (9 or 9 and 10) arranged to receive light of the first (e.g., green) spectral portion from the second polarization separator (2), to modulate the polarization of said light on a pixel-by-pixel basis, and to reflect said light back to the second polarization separator (2);

(f) a reflective liquid crystal device (14 or 14 and 10) arranged to receive light of the third (e.g., red) spectral portion from the second polarization separator (2), to modulate the polarization of said light on a pixel-by-pixel basis, and to reflect said light back to the second polarization separator (2);

(g) a third polarization separator (3) arranged to receive the second polarized component (e.g., S-polarization) from the first polarization separator (1);

(h) a second filter (12) between the first polarization separator (1) and the third polarization separator (3), said filter (12) transmitting substantially only light of the second (e.g., blue) and third (e.g., red) spectral portions to the third polarization separator (3);

(i) a second polarization converting filter (13) between the first polarization separator (1) and the third polarization separator (3), said second polarization converting filter (13) rotating the polarization (e.g., S-polarization) of one of the second (e.g., blue) and third (e.g. red) spectral portions by 90 degrees (e.g., rotating the polarization of the blue spectral portion to P-polarization);

(j) a reflective liquid crystal device (15 or 15 and 10) arranged to receive light of the second (e.g., blue) spectral portion from the third polarization separator (3), to modulate the polarization of said light on a pixel-by-pixel basis, and to reflect said light back to the third polarization separator (3);

(k) a reflective liquid crystal device (14 or 14 and 10) arranged to receive light of the third (e.g., red) spectral portion from the third polarization separator (3), to modulate the polarization of said light on a pixel-by-pixel basis, and to reflect said light back to the third polarization separator (3);

(l) a fourth polarization separator (4) arranged to:
(A) receive polarization modulated light of the first (e.g., green) and third (e.g., red) spectral portions from the second polarization separator (2) and polarization modulated light of the second (e.g., blue) and third (e.g., red) spectral portions from the third polarization separator (3), and (B) provide said received polarization modulated light of the first (e.g., green), second (e.g., blue), and third (e.g., red) spectral portions to the projection lens (11); and (m) a third polarization converting filter (17) between the second polarization separator (2) and the fourth polarization separator (4), said polarization converting filter (17) rotating by 90 degrees the polarization of light of the spectral portion (e.g., red) whose polarization was rotated by the first polarization converting filter (17); and (n) a fourth polarization converting filter (13) between the third polarization separator (3) and the fourth polarization separator (4), said polarization converting filter (13) rotating by 90 degrees the polarization of light of the spectral portion (e.g., blue) whose polarization was rotated by the second polarization converting filter (13).

In accordance with both the first and second aspects of the invention, the optical system preferably further comprises first and second "clean-up" polarizers (7) for the first (e.g., P) and second (e.g., S) polarized components produced by the first polarization separator (1), the first "clean-up" polarizer transmitting substantially only the first polarized component (e.g., P-polarization) and the second "clean-up" polarizer transmitting substantially only the second polarized component (e.g., S-polarization). Such "clean-up" polarizers, although preferred, are not required for the operation of the system and one or both of them may be omitted. Alternatively, additional "clean-up" polarizers at other locations in the system can be used if desired. The decision on whether or not to use "clean-up" polarizers, as well as the decision on the number and locations of such polarizers when used, will depend on the particular polarization properties of the polarization separators employed in the system, as well as on the desired performance properties for the system.

In accordance with a third aspect, the invention provides a method for producing a colored image from illumination light, said illumination light comprising first (e.g., green), second (e.g., blue), and third (e.g., red) spectral portions, said method comprising:

(a) separating the illumination light into a first polarized component having a first polarization (e.g., P-polarization) and a second polarized component having a second polarization (e.g., S-polarization), said second polarization being orthogonal to said first polarization;

(b) filtering the first polarized component to separate the first (e.g., green) spectral portion of that component from the second (e.g., blue) and third (e.g., red) spectral portions;

(c) dividing the separated first (e.g., green) spectral portion of step (b) into pixels, modulating the polarization of said portion on a pixel-by-pixel basis, and separating light which has been polarization modulated from light which has not been polarization modulated;

(d) filtering the second polarized component (e.g., S-polarization) to:
  (i) separate the second (e.g., blue) and third (e.g., red) spectral portions of that component from the first (e.g., green) spectral portion; and
  (ii) rotate the polarization of the second (e.g., blue) spectral portion by 90 degrees (e.g., to P-polarization);

(e) separating the second (e.g., blue) and third (e.g., red) spectral portions of the filtered second polarized component of step (d) from one another based on their respective polarizations (e.g., S-polarization for red and P-polarization for blue);

(f) dividing the separated second (e.g., blue) spectral portion of step (e) into pixels, modulating the polarization of said portion on a pixel-by-pixel basis, and separating light which has been polarization modulated from light which has not been polarization modulated;

(g) dividing the separated third (e.g., red) spectral portion of step (e) into pixels, modulating the polarization of said portion on a pixel-by-pixel basis, and separating light which has been polarization modulated from light which has not been polarization modulated;

(h) combining the polarization modulated second (e.g., blue) and third (e.g., red) spectral portions of steps (f) and (g);

(i) filtering the combined polarization modulated spectral (e.g., blue and red) portions of step (h) to rotate the polarization of the second (e.g., blue) spectral portion by 90 degrees;

(j) combining the polarization modulated first (e.g., green) spectral portion of step (c) with the polarization modulated second (e.g., blue) and third (e.g., red) spectral portions of step (i); and (k) providing the combined polarization modulated spectral portions of step (j) to a projection lens to produce the colored image.

In certain preferred embodiments of this aspect of the invention, after step (a) and prior to step (c) (e.g., between steps (b) and (c)), the polarization (e.g., P-polarization) of the first (e.g., green) spectral portion of the first polarized component (e.g., the P-polarized component) is rotated by 90 degrees (e.g., to S-polarization), and after step (c) and prior to step (j), the polarization (e.g., P-polarization) of the polarization modulated first (e.g., green) spectral portion of the first polarized component (e.g. the original P-polarized component) is rotated by 90 degrees (e.g., to S-polarization).

In accordance with a fourth aspect, the invention provides a method for producing a colored image from illumination light (e.g., illumination light produced by a high-pressure mercury lamp), said illumination light comprising first (e.g., green), second (e.g., blue), and third (e.g., red) spectral portions, said method comprising:

(a) separating the illumination light into a first polarized component having a first polarization (e.g., P-polarization) and a second polarized component having a second polarization (e.g., S-polarization), said second polarization being orthogonal to said first polarization;

(b) filtering the first polarized component to:
   (i) separate the first (e.g., green) and third (e.g., red) spectral portions of that component from the second (e.g., blue) spectral portion; and
   (ii) rotate the polarization of one of the first (e.g., green) and third (e.g., red) spectral portions by 90 degrees (e.g., rotate the polarization of red from P-polarization to S-polarization);

(c) separating the first (e.g., green) and third (e.g., red) spectral portions of the filtered first polarized component of step (b) from one another based on their respective polarizations (e.g., P-polarization for green and S-polarization for red);

(d) dividing the separated first (e.g., green) spectral portion of step (c) into pixels, modulating the polarization of said portion on a pixel-by-pixel basis, and separating light which has been polarization modulated from light which has not been polarization modulated;

(e) dividing the separated third (e.g., red) spectral portion of step (c) into pixels, modulating the polarization of said portion on a pixel-by-pixel basis, and separating light which has been polarization modulated from light which has not been polarization modulated;

(f) combining the polarization modulated first (e.g., green) and third (e.g., red) spectral portions of steps (d) and (e);

(g) filtering the combined polarization modulated spectral portions of step (f) to rotate by 90 degrees the polarization of the spectral portion (e.g., red) rotated in step (b);

(h) filtering the second polarized component (e.g., S-polarization) to:
   (i) separate the second (e.g., blue) and third (e.g., red) spectral portions of that component from the first (e.g., green) spectral portion; and
   (ii) rotate the polarization of one of the second (e.g., blue) and third (e.g., red) spectral portions by 90 degrees (e.g., rotate the S-polarization of blue to P-polarization);

(i) separating the second (e.g., blue) and third (e.g., red) spectral portions of the filtered second polarized component of step (h) from one another based on their respective polarizations (e.g., S-polarization for red and P-polarization for blue);

(j) dividing the separated second (e.g., blue) spectral portion of step (i) into pixels, modulating the polarization of said portion on a pixel-by-pixel basis, and separating light which has been polarization modulated from light which has not been polarization modulated;

(k) dividing the separated third (e.g., red) spectral portion of step (i) into pixels, modulating the polarization of said portion on a pixel-by-pixel basis, and separating light which has been polarization modulated from light which has not been polarization modulated;

(l) combining the polarization modulated second (e.g., blue) and third (e.g., red) spectral portions of steps (j) and (k);

(m) filtering the combined polarization modulated spectral portions of step (l) to rotate by 90 degrees the polarization of the spectral portion (e.g., blue) rotated in step (h);

(n) combining the polarization modulated first (e.g., green) and third (e.g., red) spectral portions of step (g) with the polarization modulated second (e.g., blue) and third (e.g., red) spectral portions of step (m); and (o) providing the combined polarization modulated spectral portions of step (n) to a projection lens (11) to produce the colored image.

In certain preferred embodiments of the third and fourth aspects of the invention, the overall method includes passing the first and second polarized components produced in step (a) through "clean-up" polarizers. As discussed above the use of such "clean-up" polarizers is optional. As also discussed above, in addition to passing light through "clean-up" polarizers in step (a), the light passing through the system can be passed through further "clean-up" polarizers at other points in the overall process if desired.

It should be noted that in the optical systems of the invention, at least one of the spectral portions of the illumination light travels in a polarization path different from the polarization path in which at least one other spectral portion travels. For example, in accordance with the first and third aspects of the invention, the first spectral portion (e.g., green) travels in a separate polarization path (e.g., the P polarization path) from the polarization path (e.g., the S polarization path) of the second (e.g., blue) and third (e.g., red) spectral portions. Similarly, for the second and fourth aspects of the invention, the first spectral portion (e.g., green) travels in a separate polarization path (e.g., the P polarization path) from the polarization path (e.g., the S polarization path) of the second (e.g., blue) spectral portion.

As a result of these separate polarization paths, the throughput of the system can be increased by allowing the spectra of the spectral portions traveling in different paths to overlap. For example, for the first and third aspects of the invention, the spectrum of the first spectral portion (e.g., green) can overlap with the spectrum of at least one of the second (e.g., blue) and third (e.g., red) spectral portions (e.g., the spectrum of the green portion can overlap with the spectrum of the blue portion). Similarly, in accordance with the second and fourth aspects of the invention, the spectra of the first (e.g., green) and second (e.g., blue) portions can overlap.

As used herein, "modulating" the polarization of a spectral component on a pixel-by-pixel basis means to change (modulate) the polarization of light associated with some pixels and not change (not modulate) the polarization of light associated with other pixels based on the image to be produced. The resulting "polarization modulated light" or "polarization modulated spectral portion" constitutes that light which is to form the image, e.g., the light from the "on" pixels of a conventional LCoS.

The reference numbers used in the foregoing summaries of the various aspects of the invention are for illustrative purposes only and are not intended to limit the scope of the invention in any way.

Figure 1:
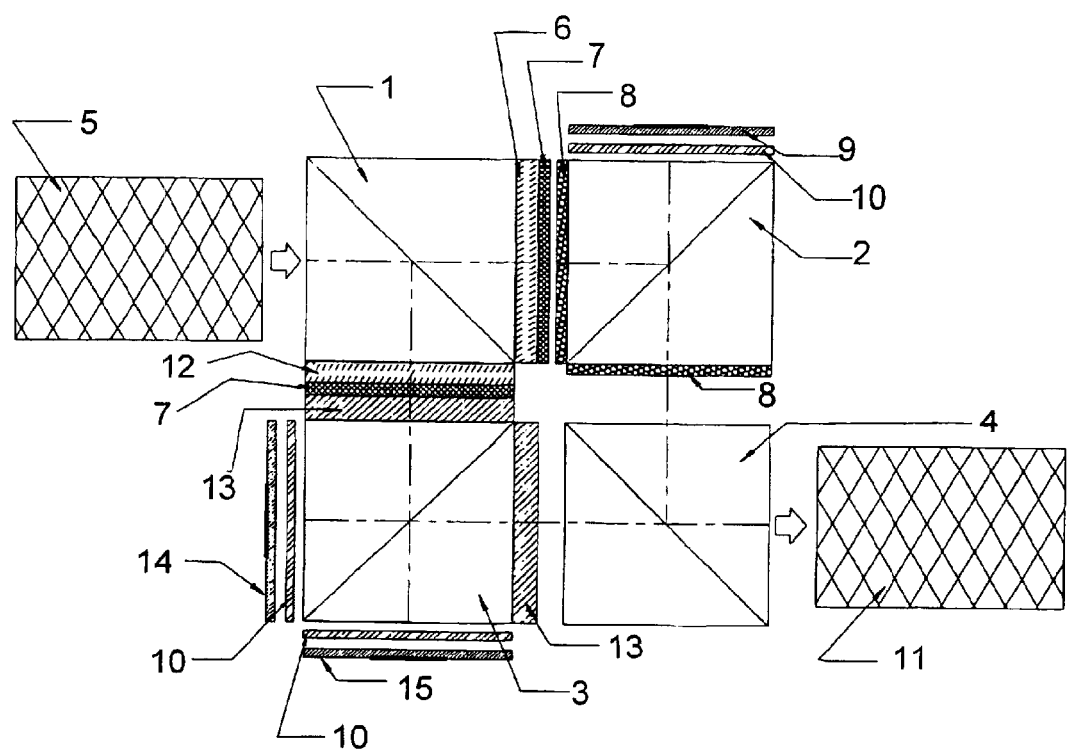
FIG. 1 is a schematic diagram of an optical system designed in accordance with the invention which employs 3 LCoS panels, 2 COLORSELECT™ polarization filters, and 2 half-wave plates.

The foregoing drawings, which are incorporated in and constitute part of the specification, illustrate various aspects of the invention, and together with the description, serve to explain the principles of the invention. It is to be understood, of course, that both the drawings and the description are explanatory only and are not restrictive of the invention. The drawings are not intended to indicate scale or relative proportions of the elements shown therein.

The reference numbers used in the drawings correspond to the following:

1 PBS1
2 PBS2
3 PBS3
4 PBS4
5 illumination system
6 green dichroic filter
7 polarizer
8 half-wave plate
9 LCoS (green)
10 quarter-wave plate
11 projection lens
12 magenta dichroic filter
13 blue/yellow COLORSELECT™ filter
14 LCoS (red)
15 LCoS (blue)
16 cyan dichroic filter
17 red/cyan COLORSELECT™ filter

DESCRIPTION OF THE INVENTION

The architecture and components of one embodiment of the present invention are shown in FIG. 1. The system includes the following components:

three LCoS panels with a quarter-wave plate in front of each panel,
four polarization beamsplitters (PBSs),
two blue/yellow COLORSELECT™ filters sold by Colorlink Inc., Boulder, Colo. (see Sharp, U.S. Pat. No. 5,751,384),
two dichroic filters,
two halfwave plates, and
two sheet polarizers.

Figure 2:
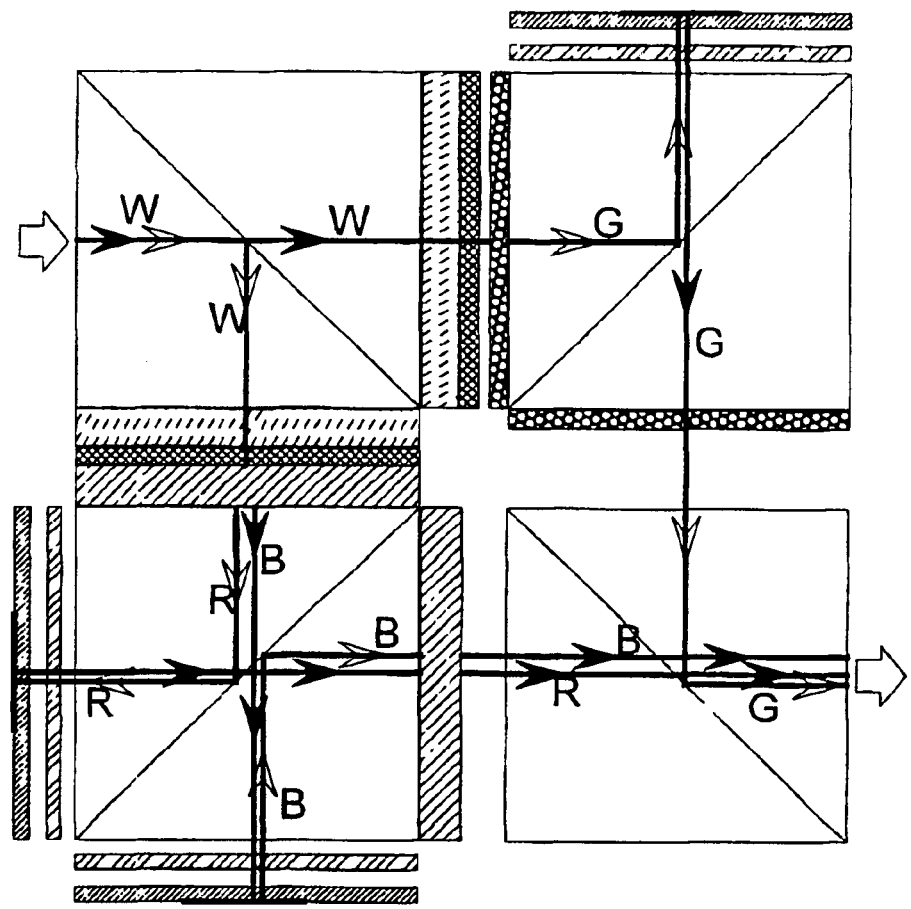
FIG. 2 is a schematic diagram illustrating light propagation through the 3 panel system of FIG. 1. The letters W, R, G, and B used in this figure represent white light, red light, green light, and blue light, respectively. The small solid arrows represent P polarization and the small open arrows represent S polarization.

FIG. 2 shows the propagation of light that creates the image on the screen. The solid and open arrows indicate different directions of polarization. The color of the light at different points in the system is indicated by the letters W, G, R, and B.

As shown in FIG. 1 and FIG. 2, randomly polarized light from the source (illumination system) enters into the optical system and is separated into S and P polarization on the diagonal of PBS1.

Transmitted white P-polarized light interacts with a dichroic green filter which transmits green light and reflects the red and blue portions of the spectrum. The reflected light goes back into the illumination system. Transmitted green light passes through a sheet polarizer which is oriented to transmit P-polarization. This polarizer absorbs the small portion of S-polarized light which leaks through the diagonal of PBS1. The transmitted green light then propagates through a half-wave plate, which rotates the polarization direction by 90 degrees so as to make the light polarized in the S direction. The S-polarized light then reflects from the PBS2 diagonal and illuminates the "green" LCoS panel. Reflection from "off" pixels does not change polarization and thus light reflected from these pixels goes back through PBS2 and PBS1 to the illuminator. Reflection from "on" pixels changes the polarization by 90 degrees. This means that green light reflected from "on" pixels has P polarization and propagates through the diagonal of PBS2. This light then interacts with a half-wave plate and becomes S polarized. This S-polarized light reflects from the PBS4 diagonal into the projection lens.

White S-polarized light, which is reflected from PBS1 diagonal, interacts with a magenta dichroic filter. The red and blue portions of the spectrum are transmitted by this filter and the green portion of the light is reflected back into the illuminator. Light transmitted by the filter passes through a sheet polarizer which absorbs P polarization, i.e., the small leakage of P polarization through PBS1 in this direction. After that, the S-polarized light interacts with a blue/yellow COLORSELECT™ filter. This component rotates the polarization of blue light by 90 degrees, but does not change the polarization direction of the rest of the spectrum.

Blue P-polarized light propagates through the diagonal of PBS3 and illuminates the "blue" LCoS panel. Light reflected from "off" pixels does not change polarization and returns back to the illuminator. Light reflected from "on" pixels has S polarization and reflects from the PBS3 diagonal. Interaction of this light with another blue/yellow COLORSELECT™ filter changes its polarization into P polarization, so that the light passes through the PBS4 diagonal and into the projection lens.

Red S-polarized light after the first blue/yellow COLORSELECT™ filter is reflected from the diagonal of PBS3 and illuminates the "red" LCoS panel. "Off" pixels send light back into the illuminator while "on" pixels produce red P-polarized light. This light passes through the PBS3 diagonal and then through the second blue/yellow COLORSELECT™ filter without changing polarization. As a result, the light passes through the PBS4 diagonal and enters into the projection lens.

Figure 6:
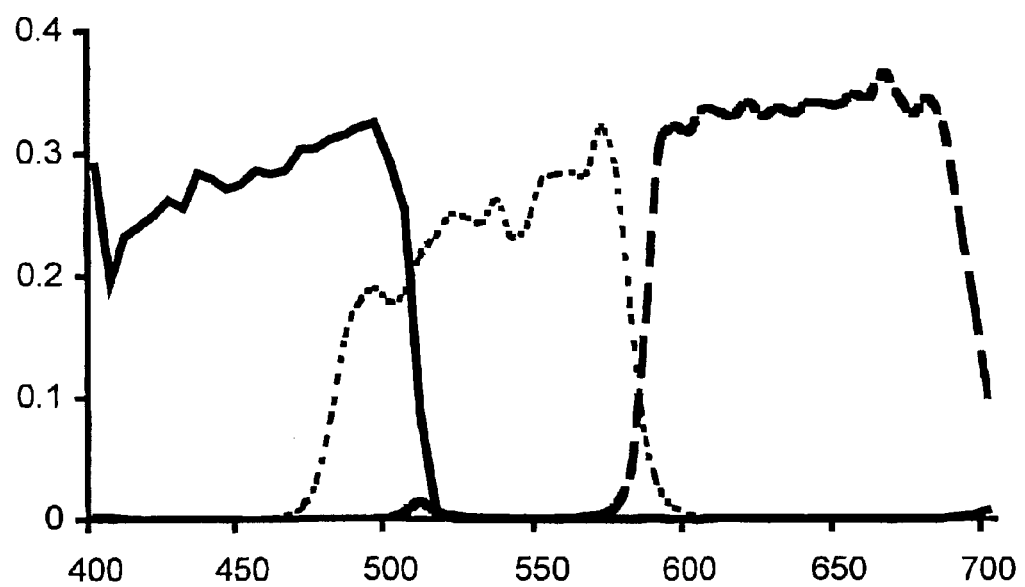
FIG. 6 illustrates the overlapping of green and blue transmission factors which the invention permits because green and blue light are modulated in different polarization channels. The horizontal axis in this figure shows wavelength in nanometers while the vertical axis represents the fraction of transmitted light.

The contrast of this system is determined by residual polarization leakage through the PBS diagonals and by the properties of the sheet polarizers and the half-wave plates. Experimentally, it has been found that the contrast of the system is better than 900:1, e.g., better than 1200:1. The color purity of the red, green, and blue light and color temperature of the white light on the screen can be controlled by the properties of the dichroic filters, which properties can be accurately controlled by known processes for manufacturing such filters. Also, the configuration of FIG. 1 and FIG. 2 allows overlapping of the spectrums of green and blue light because they belong to different polarizations. In particular, as shown in FIG. 6, the passband for green light can overlap with the passband for blue light. In this way, system throughput can be increased.

Figure 3:
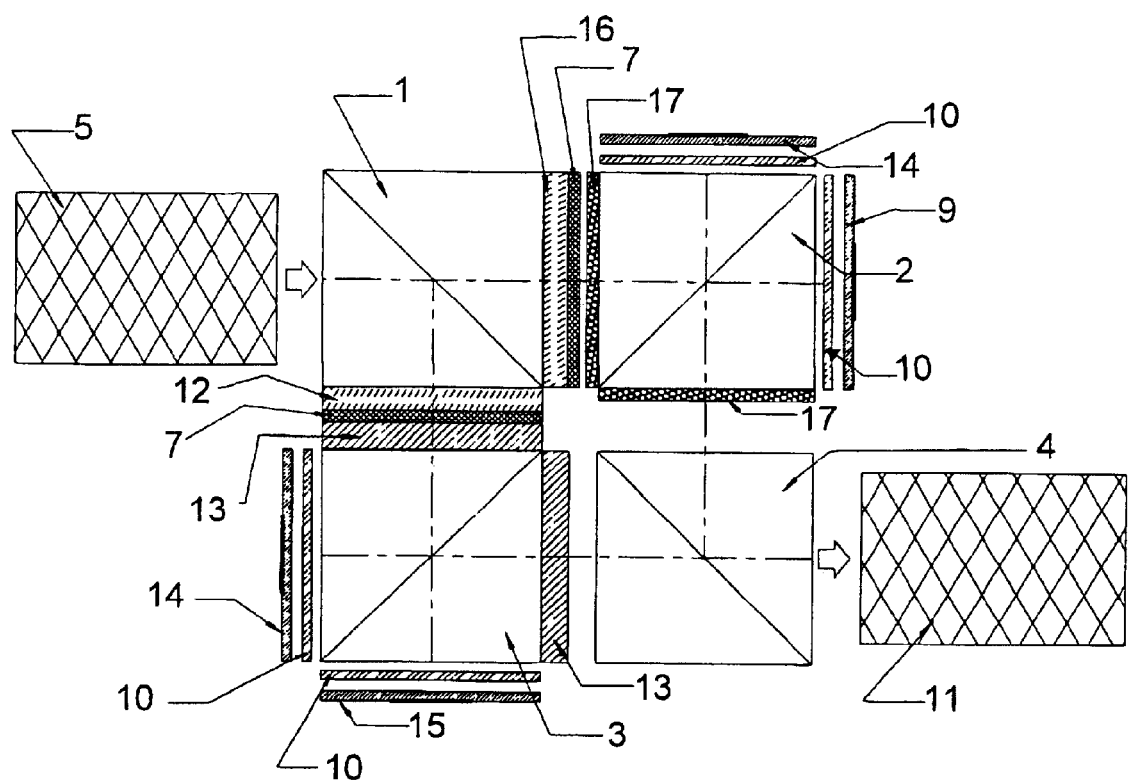
FIG. 3 is a schematic diagram of an optical system designed in accordance with the invention which employs 4 LCoS panels and 4 COLORSELECT™ polarization filters.
Figure 4:
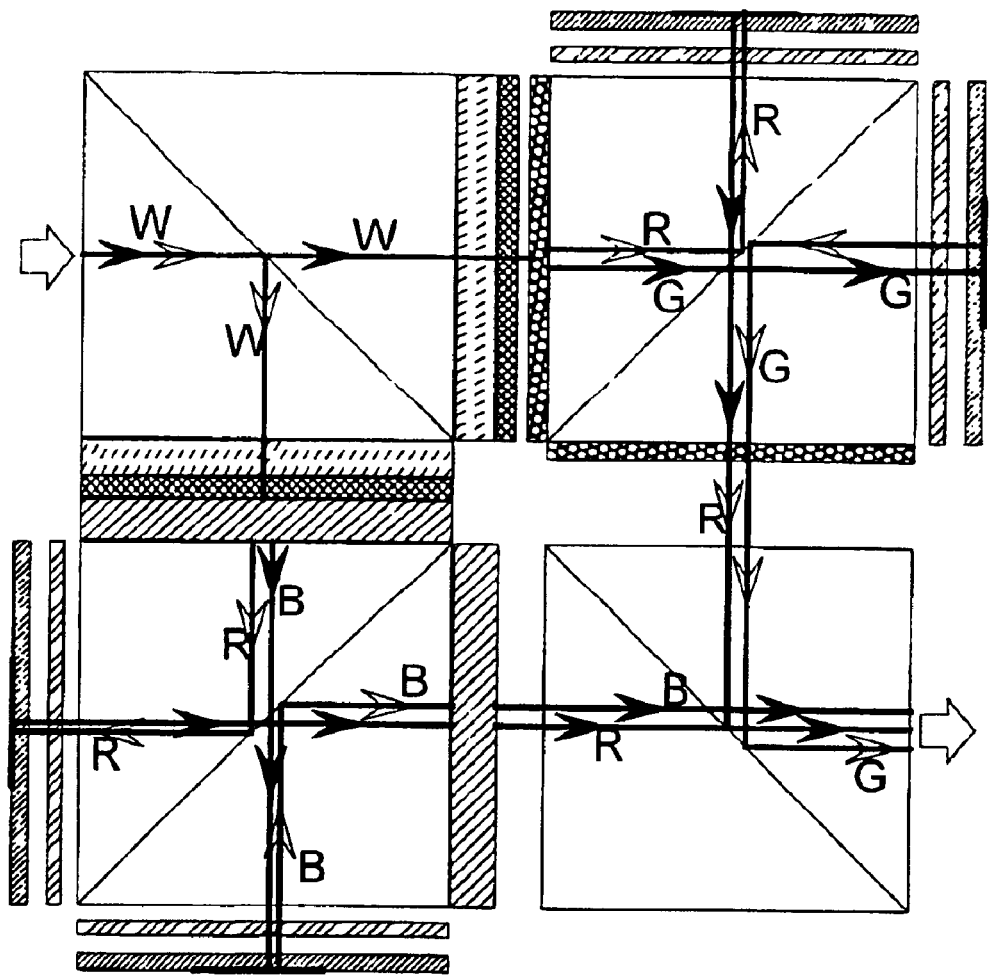
FIG. 4 is a schematic diagram illustrating light propagation through the 4 panel system of FIG. 3. The letters W, R, G, and B used in this figure represent white light, red light, green light, and blue light, respectively. The small solid arrows represent P polarization and the small open arrows represent S polarization.

A modification of the system of FIG. 1 and FIG. 2 is shown in FIG. 3 and FIG. 4.

Figure 5:
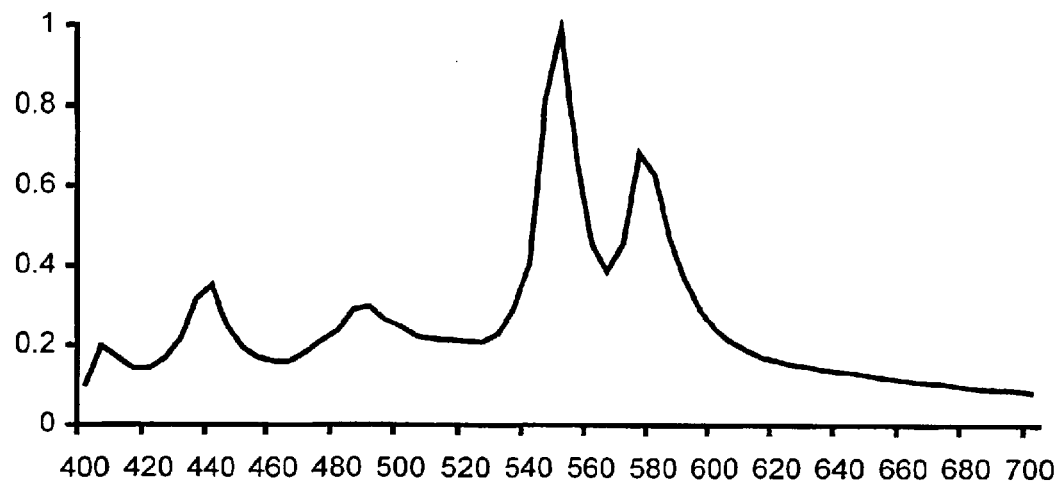
FIG. 5 shows a typical spectrum of a UHP type lamp. The horizontal axis in this figure shows wavelength in nanometers while the vertical axis is intensity in arbitrary units.

As discussed above, a preferred source of light for use in LCoS projectors is a UHP type lamp (high-pressure mercury lamp) which has a long lifetime and a small arc size. The spectrum of this lamp is shown in FIG. 5. As can be seen in this figure, the lamp has limited intensity in the red band. In the current system discussed above, the deficit of red light produced by a UHP type lamp has required reducing the transmission factor for green and blue light to achieve the desired proportions. Such reductions have significantly reduced the throughput of the system.

The system shown in FIG. 3 and FIG. 4 addresses this problem. The system has four channels: one blue, one green and two reds. It requires four LCoS panels, but allows almost double the effective throughput of the system. The green dichroic filter in front of PBS2 is replaced with a cyan dichroic filter, which transmits green and red light and reflects the blue portion of spectrum. The two half-wave plates on the input and output sides of PBS2 are replaced with two identical red/cyan COLORSELECT™ filters. These filters rotate the polarization direction by 90 degrees for red light but do not affect polarization for the rest of the spectrum. This means that incoming cyan light with P polarization is divided by the first red/cyan COLORSELECT™ filter into red light with S polarization and green light with P polarization.

The green P polarized light transmits through the PBS2 diagonal and illuminates the "green" LCoS panel. Reflection from "off" pixels returns back to the illuminator. Reflection from "on" pixels has the opposite (S) polarization and is reflected from the diagonal of PBS2. This S-polarized green light does not change polarization when passing through the second red/cyan COLORSELECT™ filter and thus is reflected from the PBS4 diagonal into the projection lens.

Red S-polarized light entering into PBS2 is reflected from the diagonal of this polarization beam splitter and illuminates the "red" LCoS panel. "Off" pixels send light back into the illuminator and "on" pixels change the polarization to P. This reflected red P-polarized light propagates through the PBS2 diagonal and becomes S polarized after interaction with the second red/cyan COLORSELECT™ filter. This light reflects from the PBS4 diagonal and enters into the projection lens.

The remainder of the system of FIG. 3 and FIG. 4, i.e., PBS3 and its associated components, operates in the same manner as in FIG. 1 and FIG. 2.

The system shown in FIG. 3 and FIG. 4 uses green and blue light from one polarization and red light from both polarizations. In this way, the system at least partially compensates for the deficit of red light in the light source.

One possible problem, which can reduce the contrast of the system, is the residual birefringence in the material of the prisms that are located immediately in front of the LCoS panels. This birefringence can come from various sources: stress in the raw material, stress build up from the process of glass grinding/polishing, or stress induced by temperature gradients. In the presence of birefringence, the polarization of the light can be changed not by "on" pixels of a LCoS panel, but by partial rotation of polarization in the process of light propagation through the stressed material. This can create light with the same polarization as light reflected from "on" pixels of a panel. This "wrong" light cannot be filtered out and will reduce the contrast of the system. To avoid this, PBS2 and PBS3 can be manufactured from optical glass with a low photoelastic constant, such as SF57 (Schott) or PBH55 (Ohara).

Although specific embodiments of the invention have been described and illustrated, it will be apparent to those skilled in the art that modifications and variations can be made without departing from the invention's spirit and scope.

For example, instead of using polarization beam splitters and, in particular, instead of using polarization beam splitters composed of an optical glass having a low photoelastic constant, the polarization separator can be a thin wire grid polarizer of the type described in commonly-assigned U.S. provisional application Ser. No. 60/292,178, filed on May 18, 2001 and entitled POLARIZATION ARRANGEMENT, the contents of which are incorporated herein by reference.

Similarly, if desired, the locations of the various reflective liquid crystal devices can be changed from those shown in the figures by suitable selection of the polarization converting filters and/or spectral filters. For example, the locations of LCoS 14 and LCoS 15 with respect to PBS3 can be interchanged by using polarization converting filters 13 that rotate the polarization of red light instead of blue light. Similarly, in FIGS. 3 and 4, the locations of LCoS 9 and LCoS 14 with respect to PBS2 can be interchanged by using polarization converting filters 17 that rotate the polarization of green light rather than red light.

A variety of other modifications which do not depart from the scope and spirit of the invention will be evident to persons of ordinary skill in the art from the disclosure herein. The following claims are intended to cover the specific embodiments set forth herein as well as such modifications, variations, and equivalents.

What is claimed is:

1. An optical system for use with a projection lens and an illumination system that produces randomly polarized light, said randomly polarized light comprising first, second, and third spectral portions, said optical system comprising:
   (a) a first polarization separator arranged to receive light from the illumination system and to separate that light into a first polarized component having a first polarization and a second polarized component having a second polarization, said second polarization being orthogonal to said first polarization;
   (b) a second polarization separator arranged to receive the first polarized component from the first polarization separator;
   (c) a first filter between the first polarization separator and the second polarization separator, said filter transmitting substantially only light of the first spectral portion to the second polarization separator;
   (d) a reflective liquid crystal device arranged to receive light of the first spectral portion from the second polarization separator, to modulate the polarization of said light on a pixel-by-pixel basis, and to reflect said light back to the second polarization separator;
   (e) a third polarization separator arranged to receive the second polarized component from the first polarization separator;
   (f) a second filter between the first polarization separator and the third polarization separator, said filter transmitting substantially only light of the second and third spectral portions to the third polarization separator;
   (g) a first polarization converting filter between the first polarization separator and the third polarization separator, said first polarization converting filter rotating the polarization of the second spectral portion by 90 degrees;
   (h) a reflective liquid crystal device arranged to receive light of the second spectral portion from the third polarization separator, to modulate the polarization of said light on a pixel-by-pixel basis, and to reflect said light back to the third polarization separator;
   (i) a reflective liquid crystal device arranged to receive light of the third spectral portion from the third polarization separator, to modulate the polarization of said light on a pixel-by-pixel basis, and to reflect said light back to the third polarization separator;
   (j) a fourth polarization separator arranged to:
      (A) receive polarization modulated light of the first spectral portion from the second polarization separator and polarization modulated light of the second and third spectral portions from the third polarization separator, and
      (B) provide said received polarization modulated light of the first, second, and third spectral portions to the projection lens; and
   (k) a second polarization converting filter between the third polarization separator and the fourth polarization separator, said polarization converting filter rotating the polarization of the second spectral portion by 90 degrees.

2. The optical system of claim 1 wherein the first polarization converting filter is between the second filter and the third polarization separator.

3. The optical system of claim 1 further comprising:
   (i) a half-wave plate between the first polarization separator and the second polarization separator; and
   (ii) a half-wave plate between the second polarization separator and the fourth polarization separator.

4. The optical system of claim 1 further comprising:
   (i) a first polarizer between the first polarization separator and the second polarization separator, said first polarizer transmitting substantially only the first polarization; and
   (ii) a second polarizer between the first polarization separator and the first polarization converting filter, said second polarizer transmitting substantially only the second polarization.

5. The optical system of claim 4 wherein the first polarizer is between the first filter and the second polarization separator and the second polarizer is between the second filter and the first polarization converting filter.

6. The optical system of claim 1 further comprising:
   (i) a first polarizer between the first polarization separator and the second polarization separator, said first polarizer transmitting substantially only the first polarization;
   (ii) a second polarizer between the first polarization separator and the first polarization converting filter, said second polarizer transmitting substantially only the second polarization;
   (iii) a half-wave plate between the first polarizer and the second polarization separator; and
   (iv) a half-wave plate between the second polarization separator and the fourth polarization separator.

7. The optical system of claim 6 wherein the first polarizer is between the first filter and the second polarization separator and the second polarizer is between the second filter and the first polarization converting filter.

8. The optical system of claim 1 wherein the first spectral portion has a spectrum which overlaps a spectrum of at least one of the second and third spectral portions.

9. The optical system of claim 1 wherein the first spectral portion comprises green light, the second spectral portion comprises blue light, and the third spectral portion comprises red light.

10. The optical system of claim 9 wherein the first and second spectral portions have spectra which overlap.

11. The optical system of claim 1 wherein the first polarized component is P-polarized and the second polarized component is S-polarized.

12. An optical system for use with a projection lens and an illumination system that produces randomly polarized light, said randomly polarized light comprising first, second, and third spectral portions, said optical system comprising:
   (a) a first polarization separator arranged to receive light from the illumination system and to separate that light into a first polarized component having a first polarization and a second polarized component having a second polarization, said second polarization being orthogonal to said first polarization;

(b) a second polarization separator arranged to receive the first polarized component from the first polarization separator;

(c) a first filter between the first polarization separator and the second polarization separator, said filter transmitting substantially only light of the first and third spectral portions to the second polarization separator;

(d) a first polarization converting filter between the first polarization separator and the second polarization separator, said first polarization converting filter rotating the polarization of one of the first and third spectral portions by 90 degrees;

(e) a reflective liquid crystal device arranged to receive light of the first spectral portion from the second polarization separator, to modulate the polarization of said light on a pixel-by-pixel basis, and to reflect said light back to the second polarization separator;

(f) a reflective liquid crystal device arranged to receive light of the third spectral portion from the second polarization separator, to modulate the polarization of said light on a pixel-by-pixel basis, and to reflect said light back to the second polarization separator;

(g) a third polarization separator arranged to receive the second polarized component from the first polarization separator;

(h) a second filter between the first polarization separator and the third polarization separator, said filter transmitting substantially only light of the second and third spectral portions to the third polarization separator;

(i) a second polarization converting filter between the first polarization separator and the third polarization separator, said second polarization converting filter rotating the polarization of one of the second and third spectral portions by 90 degrees;

(j) a reflective liquid crystal device arranged to receive light of the second spectral portion from the third polarization separator, to modulate the polarization of said light on a pixel-by-pixel basis, and to reflect said light back to the third polarization separator;

(k) a reflective liquid crystal device arranged to receive light of the third spectral portion from the third polarization separator, to modulate the polarization of said light on a pixel-by-pixel basis, and to reflect said light back to the third polarization separator;

(l) a fourth polarization separator arranged to:
  (A) receive polarization modulated light of the first and third spectral portions from the second polarization separator and polarization modulated light of the second and third spectral portions from the third polarization separator, and
  (B) provide said received polarization modulated light of the first, second, and third spectral portions to the projection lens; and (m) a third polarization converting filter between the second polarization separator and the fourth polarization separator, said polarization converting filter rotating by 90 degrees the polarization of light of the spectral portion whose polarization was rotated in step (d); and (n) a fourth polarization converting filter between the third polarization separator and the fourth polarization separator, said polarization converting filter rotating by 90 degrees the polarization of light of the spectral portion whose polarization was rotated in step (i).

13. The optical system of claim 12 wherein the first polarization converting filter is between the first filter and the second polarization separator and the second polarization converting filter is between the second filter and the third polarization separator.

14. The optical system of claim 12 further comprising:
  (i) a first polarizer between the first polarization separator and the first polarization converting filter, said first polarizer transmitting substantially only the first polarized component; and
  (ii) a second polarizer between the first polarization separator and the second polarization converting filter, said second polarizer transmitting substantially only the second polarized component.

15. The optical system of claim 14 wherein the first polarizer is between the first filter and the first polarization converting filter and the second polarizer is between the second filter and the second polarization converting filter.

16. The optical system of claim 12 wherein the first and second spectral portions have spectra which overlap.

17. The optical system of claim 12 wherein the first spectral portion comprises green light, the second spectral portion comprises blue light, and the third spectral portion comprises red light.

18. The optical system of claim 17 wherein the first and second spectral portions have spectra which overlap.

19. The optical system of claim 17 wherein the polarization of the third spectral portion is rotated by the first polarization converting filter and the polarization of the second spectral portion is rotated by the second polarization converting filter.

20. The optical system of claim 17 in combination with an illumination system which comprises a high-pressure mercury lamp.

21. The optical system of claim 12 wherein the first polarized component is P-polarized and the second polarized component is S-polarized.

22. A method for producing a colored image from illumination light, said illumination light comprising first, second, and third spectral portions, said method comprising:
  (a) separating the illumination light into a first polarized component having a first polarization and a second polarized component having a second polarization, said second polarization being orthogonal to said first polarization;
  (b) filtering the first polarized component to separate the first spectral portion of that component from the second and third spectral portions;
  (c) dividing the separated first spectral portion of step (b) into pixels, modulating the polarization of said portion on a pixel-by-pixel basis, and separating light which has been polarization modulated from light which has not been polarization modulated;
  (d) filtering the second polarized component to:
    (i) separate the second and third spectral portions of that component from the first spectral portion; and
    (ii) rotate the polarization of the second spectral portion by 90 degrees;
  (e) separating the second and third spectral portions of the filtered second polarized component of step (d) from one another based on their respective polarizations;
  (f) dividing the separated second spectral portion of step (e) into pixels, modulating the polarization of said portion on a pixel-by-pixel basis, and separating light which has been polarization modulated from light which has not been polarization modulated;

(g) dividing the separated third spectral portion of step (e) into pixels, modulating the polarization of said portion on a pixel-by-pixel basis, and separating light which has been polarization modulated from light which has not been polarization modulated;

(h) combining the polarization modulated second and third spectral portions of steps (f) and (g);

(i) filtering the combined polarization modulated spectral portions of step (h) to rotate the polarization of the second spectral portion by 90 degrees;

(j) combining the polarization modulated first spectral portion of step (c) with the polarization modulated second and third spectral portions of step (i); and (k) providing the combined polarization modulated spectral portions of step (j) to a projection lens to produce the colored image.

23. The method of claim 22 wherein:

after step (a) and prior to step (c), the polarization of the first spectral portion of the first polarized component is rotated by 90 degrees, and after step (c) and prior to step (j), the polarization of the polarization modulated first spectral portion of the first polarized component is rotated by 90 degrees.

24. The method of claim 22 wherein:

between steps (b) and (c), the first spectral portion of the first polarized component is passed through a polarizer which transmits substantially only the first polarization, and in step (d), the separated second and third spectral portions of the second polarized component are passed through a polarizer which transmits substantially only the second polarization.

25. The method of claim 22 wherein:

between steps (b) and (c), the first spectral portion of the first polarized component is passed through a polarizer which transmits substantially only the first polarization and then the polarization of the first spectral portion of the first polarized component is rotated by 90 degrees, in step (d), the separated second and third spectral portions of the second polarized component are passed through a polarizer which transmits substantially only the second polarization, and after step (c) and prior to step (j), the polarization of the polarization modulated first spectral portion of the first polarized component is rotated by 90 degrees.

26. The method of claim 22 wherein the first spectral portion has a spectrum which overlaps a spectrum of at least one of the second and third spectral portions.

27. The method of claim 22 wherein the first spectral portion comprises green light, the second spectral portion comprises blue light, and the third spectral portion comprises red light.

28. The method of claim 27 wherein the first and second spectral portions have spectra which overlap.

29. The method of claim 22 wherein the first polarized component is P-polarized and the second polarized component is S-polarized.

30. A method for producing a colored image from illumination light, said illumination light comprising first, second, and third spectral portions, said method comprising:

(a) separating the illumination light into a first polarized component having a first polarization and a second polarized component having a second polarization, said second polarization being orthogonal to said first polarization;

(b) filtering the first polarized component to:
  (i) separate the first and third spectral portions of that component from the second spectral portion; and
  (ii) rotate the polarization of one of the first and third spectral portions by 90 degrees;

(c) separating the first and third spectral portions of the filtered first polarized component of step (b) from one another based on their respective polarizations;

(d) dividing the separated first spectral portion of step (c) into pixels, modulating the polarization of said portion on a pixel-by-pixel basis, and separating light which has been polarization modulated from light which has not been polarization modulated;

(e) dividing the separated third spectral portion of step (c) into pixels, modulating the polarization of said portion on a pixel-by-pixel basis, and separating light which has been polarization modulated from light which has not been polarization modulated;

(f) combining the polarization modulated first and third spectral portions of steps (d) and (e);

(g) filtering the combined polarization modulated spectral portions of step (f) to rotate by 90 degrees the polarization of the spectral portion rotated in step (b);

(h) filtering the second polarized component to:
  (i) separate the second and third spectral portions of that component from the first spectral portion; and
  (ii) rotate the polarization of one of the second and third spectral portions by 90 degrees;

(i) separating the second and third spectral portions of the filtered second polarized component of step (h) from one another based on their respective polarizations;

(j) dividing the separated second spectral portion of step (i) into pixels, modulating the polarization of said portion on a pixel-by-pixel basis, and separating light which has been polarization modulated from light which has not been polarization modulated;

(k) dividing the separated third spectral portion of step (i) into pixels, modulating the polarization of said portion on a pixel-by-pixel basis, and separating light which has been polarization modulated from light which has not been polarization modulated;

(l) combining the polarization modulated second and third spectral portions of steps (j) and (k);

(m) filtering the combined polarization modulated spectral portions of step (1) to rotate by 90 degrees the polarization of the spectral portion rotated in step (h);

(n) combining the polarization modulated first and third spectral portions of step (g) with the polarization modulated second and third spectral portions of step (m); and (o) providing the combined polarization modulated spectral portions of step (n) to a projection lens to produce the colored image.

31. The method of claim 30 wherein:

in step (b), the separated first and third spectral portions of the first polarized component are passed through a polarizer which transmits substantially only the first polarization; and in step (h), the separated second and third spectral portions of the second polarized component are passed through a polarizer which transmits substantially only the second polarization.

32. The method of claim 30 wherein the first and second spectral portions have spectra which overlap.

33. The method of claim 30 wherein the first spectral portion comprises green light, the second spectral portion comprises blue light, and the third spectral portion comprises red light.

34. The optical system of claim 33 wherein the first and second spectral portions have spectra which overlap.

35. The method of claim 33 wherein the third spectral portion is rotated in step (b) and the second spectral portion is rotated in step (h).

36. The method of claim 33 wherein the illumination light is produced by a high-pressure mercury lamp.

* * * * *

UNITED STATES PATENT AND TRADEMARK OFFICE
CERTIFICATE OF CORRECTION

PATENT NO.    : 6,972,810 B2
DATED         : December 6, 2005
INVENTOR(S)   : Margarill, Simon It is certified that error appears in the above-identified patent and that said Letters Patent is hereby corrected as shown below:

Title page,
Item [57], ABSTRACT,
Line 2, delete "panel" and insert -- panels --.

Column 16,
Line 49, delete "(1)" and insert -- (I) --.

Signed and Sealed this

Twenty-eighth Day of March, 2006

JON W. DUDAS
*Director of the United States Patent and Trademark Office*